United States Patent
Devers

(10) Patent No.: US 6,672,596 B2
(45) Date of Patent: Jan. 6, 2004

(54) UNIFORM COMPRESSION SEAL ADAPTOR

(75) Inventor: Richard Allen Devers, Linwood, MI (US)

(73) Assignee: Delphi Technologies, Inc., Troy, MI (US)

( * ) Notice: Subject to any disclaimer, the term of this patent is extended or adjusted under 35 U.S.C. 154(b) by 230 days.

(21) Appl. No.: 09/817,556

(22) Filed: Mar. 26, 2001

(65) Prior Publication Data

US 2002/0134447 A1 Sep. 26, 2002

(51) Int. Cl.[7] .................................................. F16J 3/00
(52) U.S. Cl. ...................................... 277/636; 464/175
(58) Field of Search ............................... 277/634, 635, 277/636, 628; 464/173, 175, 111

(56) References Cited

U.S. PATENT DOCUMENTS

| | | | | |
|---|---|---|---|---|
| 3,927,576 A | * | 12/1975 | Colletti | 74/498 |
| 4,320,632 A | * | 3/1982 | Dore' | 64/21 |
| 5,009,628 A | * | 4/1991 | Rouillot | 464/111 |
| 5,213,545 A | * | 5/1993 | Ide | 464/111 |
| 5,279,522 A | * | 1/1994 | Rouillot et al. | 464/111 |
| 5,466,084 A | * | 11/1995 | Brueggen et al. | 403/134 |
| 5,529,538 A | * | 6/1996 | Schulz et al. | 464/111 |
| 5,591,084 A | * | 1/1997 | Poulin et al. | 464/111 |
| 6,089,574 A | * | 7/2000 | Sadr et al. | 277/636 |

FOREIGN PATENT DOCUMENTS

| | | | | |
|---|---|---|---|---|
| GB | 2330883 | * | 5/1999 | F16D/3/84 |
| GB | 2 330 883 | * | 5/1999 | F16D/3/84 |

OTHER PUBLICATIONS

Carley, Larry. Don't Give Into "Problem" CV Joints & FWD Shafts □□ Brake & Front End Magazine, Babcox Publications, 1998 [online], [retrieved on Feb. 11, 2003]. □□ Retrieved from the Internet <URL: http//www.babcox.com/editorial/bf/bf59824.htm>.*

* cited by examiner

Primary Examiner—Chuck Y. Mah
Assistant Examiner—Lisa Bannapradist
(74) Attorney, Agent, or Firm—Michael D. Smith

(57) ABSTRACT

A seal adaptor assembly for use in a stroking universal joint of the type having an outer drive housing member having an exterior wall of non-uniform dimension including spaces between the parts of the housing enclosing the drive channels. The seal adaptor assembly includes an annular body and a plurality of insert having greater rigidity than the material of the annular body and wherein the inserts are located in the annular body at sections thereof that are located within outer housing spaces between the drive channels. The inserts are supported within the annular body at thin wall sections thereof and thereby provide for a more uniform compression of a resilient seal member between the housing and a clamp for holding the resilient seal member in place on the housing.

20 Claims, 3 Drawing Sheets

UNIFORM COMPRESSION SEAL ADAPTOR

TECHNICAL FIELD

The present invention relates to a seal for use with a stroking universal joint bellows.

More specifically, the present invention relates to a novel seal adaptor for use on a housing in a tripot type universal joint.

BACKGROUND OF THE INVENTION

Stroking universal joints for use in connection with constant velocity joints are well known in the art. One such type of stroking joint is a tripot type. Very generally, a tripot type universal joint includes a housing that is configured to reduce weight by use of a non-round outer surface (non-circular outer profile). The normal method of attaching the round end of a thermoplastic seal to a tripot joint (or other non-round) housing is to use a seal adaptor made from a pliable thermoplastic rubber or thermoset rubber. The prior art seal adaptor has a non-round inner surface which is configured to conform to the shape of the non-round outer surface of the housing. The seal adaptor further is configured with a round outer surface which will conform to the inside diameter of a boot seal. When a clamp is installed over the end of the boot seal and tightened, it is desirable for the seal adaptor to deform in response to the clamping force so as to provide a uniform compression force and provide a good seal between the housing and adaptor as well as a good seal between the adaptor and the boot seal.

Such tripot type bellows seal joints ideally should have a uniform clamping force between the seal adaptor and the boot seal and also between the seal adaptor and the non-uniform surface of the joint housing. In fact, because of the complex shape of the adaptor, it has been found that sealing/clamping forces can vary considerably around the sealing surfaces due to an unequal distribution of stiffness of the seal adaptor attributable to the variations in cross section required to conform the seal adaptor to the non-uniform shape of a joint housing so configured to reduce weight and to save on material expense.

Known seal adaptors do not compensate for such variations in cross section.

SUMMARY OF THE INVENTION

According to the present invention, there is provided a seal adaptor assembly which is more uniform in stiffness and therefore will result in a more uniform compression of the seal adaptor which will provide a more uniform sealing/clamping force between the seal adaptor assembly and the boot seal and between the seal adaptor and the housing. The seal adaptor assembly is configured for use in a stroking universal joint of the type having drive channels and an outer drive-housing member having an exterior wall of non-uniform dimension including open spaces between the parts of the housing member enclosing the drive channels. The seal adaptor assembly includes an annular body and plurality of inserts having greater rigidity than the material of the annular body and wherein the inserts are located in the annular body at sections thereof that are located within outer housing spaces between the housing segments for the ball bores. The inserts are supported within the seal adaptor assembly at thin wall sections thereof and thereby provide for a more uniform compression of a resilient seal member between the housing and a clamp for holding the resilient seal member in place on the seal adaptor assembly.

Accordingly, it is an object of the present invention to provide a reinforced seal adaptor assembly for providing nearly uniform compression between clamped seal boot and a universal joint housing member having an outer surface with a non-uniform configuration e.g., a non-circular outer profile.

It is another object of the present invention to provide such a seal adaptor assembly between a seal and a clamp ring for securing the seal on a universal joint housing having an outer surface configured to reduce joint assembly weight and wherein sections of the adaptor assembly that fill outer open spaces in the joint housing member are reinforced.

It is another object of the present invention to provide such reinforcement by providing pockets in the seal adaptor assembly having spaced thin wall sections engageable respectively with the housing and with the seal and wherein a reinforcement member is supported within each of the pockets for providing a load transfer path from the seal to the housing member.

It is another object of the present invention to provide such a reinforcement as an insert plug made from stamped or formed sheet metal.

It is another object of the present invention to provide such an insert plug of powder metal material.

It is another object of the present invention to provide such an insert plug of rigid plastic material either hollow or solid.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE DRAWINGS

Figures 1, 3, 4:
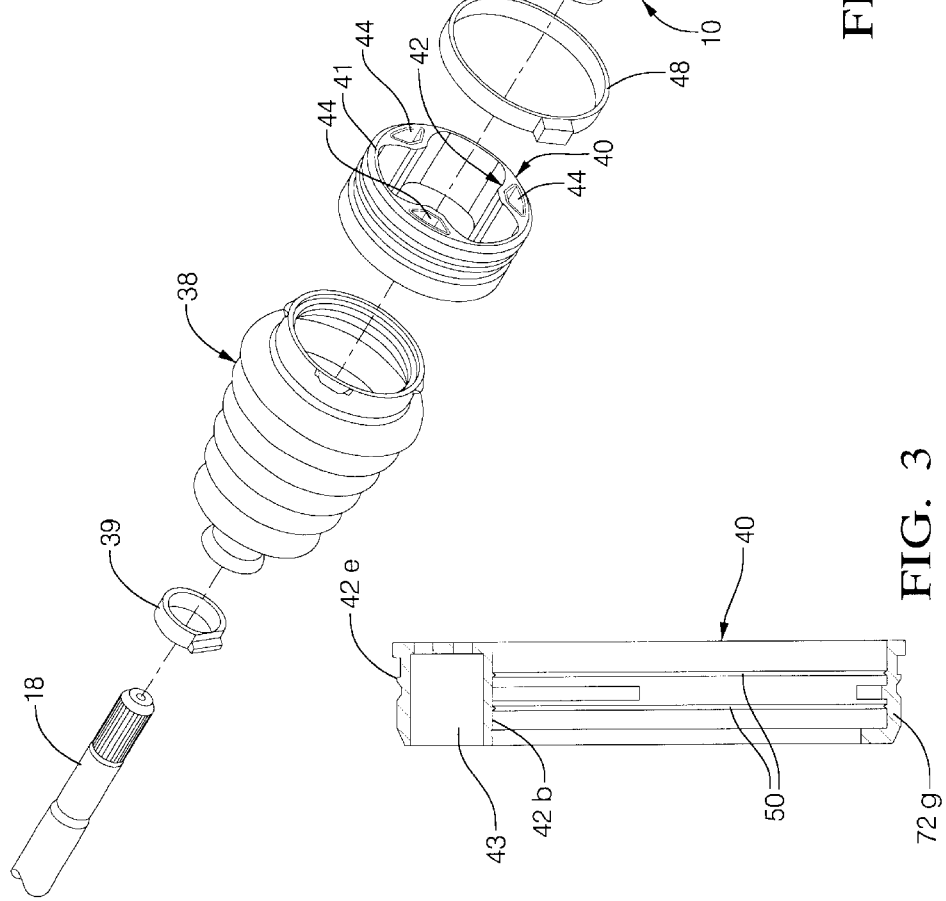
FIG. 1 is an exploded perspective view of a universal joint assembly showing one embodiment of the preferred seal adaptor assembly.
FIG. 3 is a cross-sectional view of an annular body of an adaptor assembly of the present invention prior to assembly of reinforcement therein.
FIG. 4 is an enlarged sectional view taken along the line 4—4 of FIG. 2.

FIG. 1 shows generally at 10 a universal joint of the tripot type. The tripot joint 10 includes a housing 12. The housing 12 is closed at an inboard end by an end wall 14. The joint 10 includes a drive shaft 16 integral with the end wall 14 that extends axially therefrom. The drive shaft 16 is preferably splined.

Figure 2:
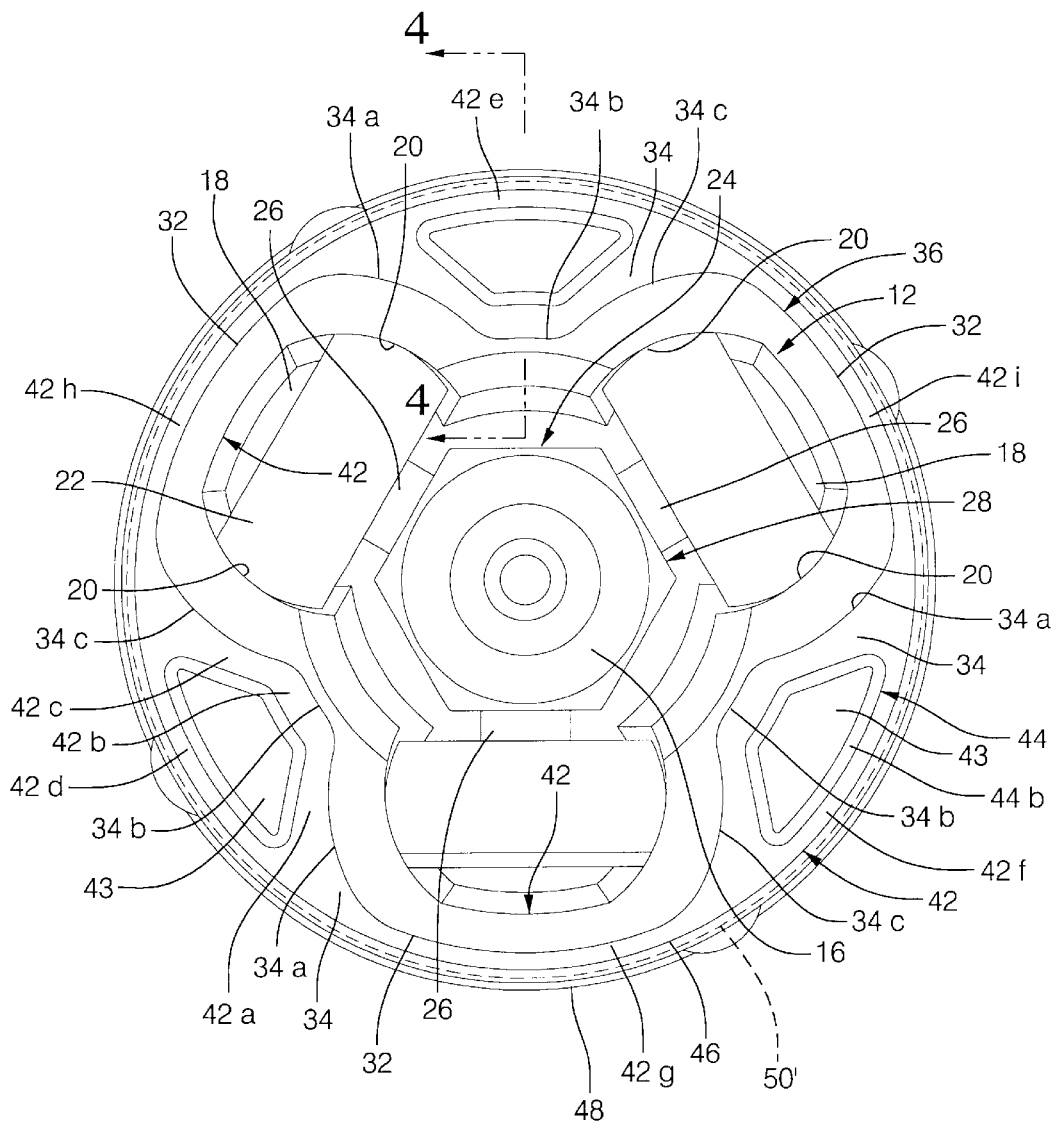
FIG. 2 is a front elevational view of the seal adaptor assembly mounted on a joint housing in accordance with a preferred embodiment of the present invention.

The housing 12 as shown in FIG. 2 is open at its outer end and has three equally circumferentially spaced and longitudinally extending drive channels 18 formed in the interior wall of the housing 12. The drive channels 18 are concentric about the longitudinal axis A of the housing 12 and the drive shaft 16. Each of the longitudinally extending channels 18 is bounded by concave side walls 20 which form part of the tracks or guides that engage the curved surfaces of associated drive rollers 22 of a spider assembly, generally indicated at 24. Furthermore, to reduce weight the housing 12 includes a plurality of outer wall spaces 34 therein defined by surfaces 34a–34c thereon (best shown in FIG. 2) between each of the drive channels 18. The surfaces 34a–34c and an outer surface 32 at each of the drive channels define a non-uniform outer surface indicated generally at 36.

The spider assembly 24 includes a hub 28 and three trunnions 27 extending radially from the hub 28. The hub 28 includes a central bore 30. The central bore 30 is splined for receiving the splined shaft 31. Preferably, the splined shaft is fixed within the central bore 30 and is for transmitting rotational movement between the shaft and the hub 28. Each of the drive rollers 22 is mounted on a trunnion 26 extending from the hub 28. The drive rollers 22 are rotatable on the trunnions 27 and thereby allow axial movement of the spider 24 in the housing 12 to allow the universal stroking and pivotal movement of the joint. With the above described assembly, each drive roller 22 is captured in the radial direction in its associated drive channel and is maintained substantially equidistant from the longitudinal axis A during joint operations. While drive rollers 22 are disclosed, it will be appreciated that any roller style may be used in accordance with the present invention. Furthermore, while a tripot type non-universal joint is shown, the present invention is applicable to any universal joint having a housing member with a non-uniform outer surface.

Figure 5:
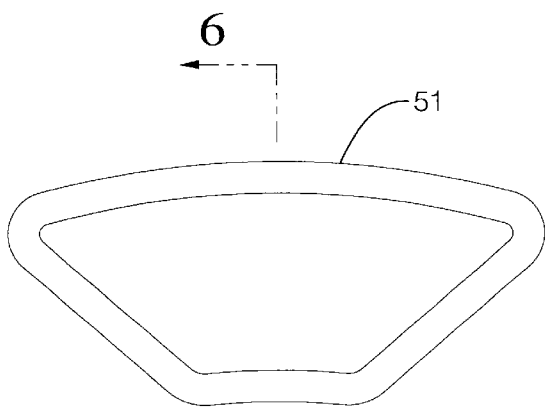
FIG. 5 is an end elevational view of another insert embodiment.
Figure 6:
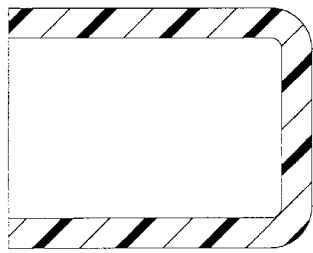
FIG. 6 is a sectional view taken along line 6—6 of FIG. 5.
Figure 7:
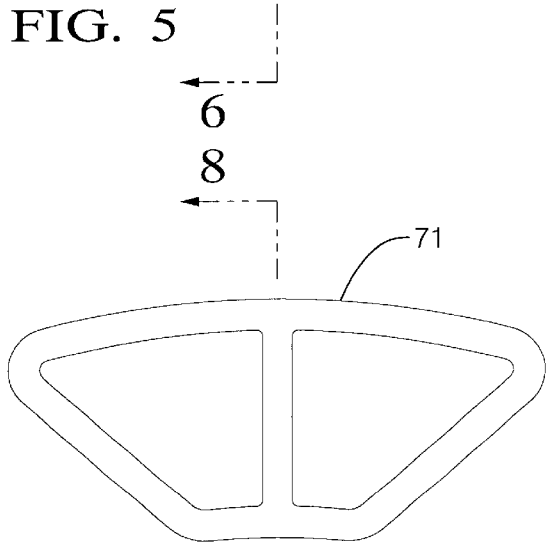
FIG. 7 is an end elevational view of still another insert embodiment.
Figure 8:
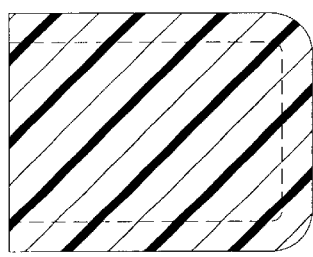
FIG. 8 is a sectional view taken along line 8—8 of FIG. 7.
Figure 9:
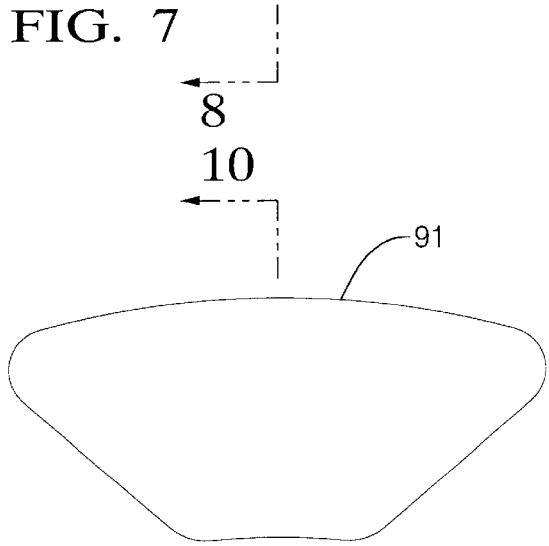
FIG. 9 is an end elevational view of yet another insert embodiment.
Figure 10:
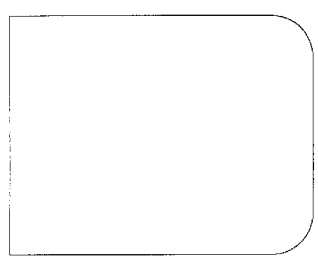
FIG. 10 is a sectional view taken along line 10—10 of FIG. 9.

To seal the housing 12 to the relatively moveable hub 28 a boot seal 38 is connected there between by clamp rings 39, 48 at opposite ends of the boot seal 38. A novel seal adaptor assembly 40 is shown in FIGS. 2–4. Generally, the seal adaptor assembly 40 comprises an annular body 41 having a specifically configured inner surface 42 that conforms to the shape of the non-uniform outer surface 36. In order to conform, the inner surface 42 includes spaced inner wall segments 42a–42c shaped to conform against the surfaces 34a–34c. Additionally, the seal adaptor assembly 40 includes thin outer wall segments 42d–42f that have the same outer radius as wall segments 42g–i. The wall segments 42g–i are supported by the outer surfaces 32 of the drive channels 18. The wall segments 42a–f define a plurality of pockets 43 within each of the housing spaces 34. In accordance with the present invention each of these pockets is filled with a generally trapezoidally shaped cup-like insert 44. Each of the inserts 44 has an inner and outer wall 44a, 44b that conform to wall segments 42a–c and 42d–f, respectively. Other embodiments of inserts are shown in FIGS. 5–10. In FIGS. 5 and 6 an insert 50 is shown as a cup-like member of sheet metal or plastic. In FIGS. 7 and 8 an insert 70 is shown as having a rib 72 in a cup-like plastic member. In FIGS. 9 and 10 an insert 90 is shown formed as a solid powdered metal, solid plastic or solid metal piece. In all of the embodiments outer surfaces 51, 71 and 91 are configured like the outer surface of insert 44.

Each insert 44 is selected to have a rigidity greater than that of the material of the annular body 41 of the seal adaptor assembly 40. In the preferred embodiment the annular body 41 is formed from thin rubber or polymeric material. In order to provide greater rigidity the inserts 44 can be formed from powdered metal or a more rigid polymeric material. The seal adaptor assembly 40 is made of a somewhat pliable material for fitting on the non-uniform outer surface 36. The inserts 44 use a rigid material that is much stiffer than the annular body material to fill the housing spaces 34. The result is to provide an adaptor assembly design that will more uniformly support the inside diameter of the end 46 of the bellows seal 38 held in place on the housing 12 by a clamp ring 48.

In the present invention, the seal adaptor assembly 40 can be assembled by a method as set-forth herein by virtue of having enough pliability to be pulled over the end 12a of the housing 12 until the specifically configured inner surface 42 thereof is located to conform to the non-uniform outer surface 36 of the housing 12. The inserts 44 can be assembled either prior to fitting of the seal adaptor assembly 40 on the housing 12 or thereafter. If preassembled, the inserts can be premolded in the pockets 43 by insert molding or they can be preformed and thereafter pressed or snapped into the pockets or cavities 43. If post assembled, the seal adaptor assembly 40 is connected to the housing 12 and the pockets or cavities 43 are thereafter filled by the inserts 44 that can be either pressed or snapped into the pockets or cavities 43. Annular ribs 48, 50 may be formed on the outer surface and inner surface of the annular body 41 of the seal adaptor assembly 40.

The invention is described in an illustrative manner, and it is to be understood that the terminology which has been used is intended to be in the nature of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. A seal adaptor assembly for use in a stroking universal joint of the type having an outer drive-housing member having a non-circular outer profile wall with outer spaces formed between drive channels defined by an interior wall said seal adaptor assembly comprising;

an annular body fabricated of a material and having a plurality of cavities configured to occupy the outer spaces in the outer drive-housing member between the drive channels;

a plurality of inserts each having greater rigidity than the material of said annular body; one of said inserts located in each of said cavities to rigidify said annular body for providing a more uniform compression of a resilient seal member by a clamp for holding the resilient seal member in place on the outer drive housing member.

2. A seal adaptor assembly as set forth in claim 1 wherein said inserts are insert plugs.

3. A seal adaptor assembly as set-forth in claim 2 wherein said insert plugs are hollow.

4. A seal adaptor assembly as set-forth in claim 2 wherein said insert plugs are ribbed.

5. A seal adaptor assembly as set-forth in claim 2 wherein said insert plugs are solid.

6. A seal adaptor assembly as set forth in claim 1 wherein said inserts are powder metal material.

7. A seal adaptor assembly as set forth in claim 1 wherein said inserts are rigid plastic material.

8. A seal adaptor assembly as set forth in claim 1 wherein said annular body has spaced thin inner wall segments engageable with said non-circular outer profile of said outer drive-housing member and thin outer wall segments defining said cavities.

9. A seal adaptor assembly for use in a stroking universal joint of the type having an inner drive spider assembly with a plurality of circumferentially spaced trunnions and an outer drive housing member having an outer non-circular wall with outer spaces formed between a plurality of elongated drive channels in an interior wall, at said outer drive housing member surrounding said spider assembly, each of said trunnions having a drive roller rotatably mounted thereon and respectively disposed for linear travel in an associated one of said drive channels, said seal adaptor assembly comprising;

an annular body fabricated of a material and having a plurality of cavities configured to occupy said outer spaces in the outer drive-housing member between the drive channels; and a plurality of inserts each having greater rigidity than the material of the annular body; one of said inserts located in each of said cavities to rigidify said annular body for providing a more uniform compression of a resilient seal member by a clamp for holding the resilient seal member in place on the outer drive housing member.

10. A seal adaptor assembly as set forth in claim 9 wherein said inserts are insert plugs.

11. A seal adaptor assembly as set-forth in claim 10 wherein said insert plugs are hollow.

12. A seal adaptor assembly as set-forth in claim 10 wherein said insert plugs are ribbed.

13. A seal adaptor assembly as set-forth in claim 10 wherein said insert plugs are solid.

14. A seal adaptor assembly as set forth in claim 9 wherein said inserts are powder metal material.

15. A seal adaptor assembly as set forth in claim 9 wherein said inserts are rigid plastic material.

16. A seal adaptor assembly as set forth in claim 9 wherein said annular body has spaced inner thin wall segments engageable with said non-circular surface and thin outer wall segments defining said cavities.

17. A method of assembling a seal adaptor assembly on a stroking universal joint having an outer drive-housing member including an outer non-circular wall with outer spaces formed between drive channels defined by an interior wall, said method comprising;

providing an annular body fabricated of a material and having a plurality of cavities configured to occupy the outer spaces in the drive housing member between the drive channels;

providing a plurality of inserts each having greater rigidity than the material of the annular body;

locating each of the inserts in one of the cavities and fitting the annular body in place on the outer drive housing.

18. In the method of claim 17, locating each of the inserts in each of said cavities to rigidify said annular body prior to fitting the annular body in place on the outer drive housing.

19. In the method of claim 17, locating each of the inserts in each of said cavities to rigidify said annular body after fitting the annular body in place on the outer drive housing.

20. In the method of claim 17, locating each of the inserts by premolding the inserts in the cavities prior to fitting the annular body in place on the outer drive housing.

* * * * *